United States Patent [19]

Assaf

[11] Patent Number: 4,498,454
[45] Date of Patent: Feb. 12, 1985

[54] METHOD OF AND MEANS FOR SEASONALLY STORING HEAT IN A BODY OF WATER

[76] Inventor: Gad Assaf, 23 Keren Kayemet St., Rehovot, Israel

[21] Appl. No.: 225,004

[22] Filed: Jan. 14, 1981

[51] Int. Cl.³ .................................................. F24J 3/02
[52] U.S. Cl. .................................. 126/415; 60/641.8; 165/45; 405/91; 405/115
[58] Field of Search ....................... 165/45; 405/61, 52, 405/91, 115, 107, 87; 261/77; 210/170; 126/415; 60/641.8

[56] References Cited

U.S. PATENT DOCUMENTS

| | | | |
|---|---|---|---|
| 3,683,627 | 8/1972 | Girden | 405/52 |
| 3,747,907 | 7/1933 | Anderson | 165/45 |
| 3,863,605 | 2/1975 | Gallup | 165/45 X |
| 4,055,145 | 10/1977 | Mager et al. | 165/45 X |
| 4,159,736 | 7/1979 | Denis et al. | 165/45 X |

OTHER PUBLICATIONS
WO 80/02235 Publ. Oct. 30, 1980, Lagstrum et al.

*Primary Examiner*—Sheldon J. Richter

[57] ABSTRACT

Heat is stored in a closed basin having a net inflow of relatively fresher water connected by a strait to a larger body of relatively saltier water by selectively controlling the exchange of water between the body and the basin as a function of the season of the year. In summer, the exchange of water is promoted thereby permitting relatively warmer and saltier water outside the basin to flow through the strait into the depths of the basin. In winter, the exchange of water between the basin and the body of water is suppressed thereby trapping warm, relatively saltier water in the lower regions of the basin, the warm water being available during the winter and being protected against heat loss by a surface layer of relatively fresher water. The heat thus stored can be utilized in various energy conversion processes such as heat pumps to raise the temperature to useful levels.

18 Claims, 8 Drawing Figures

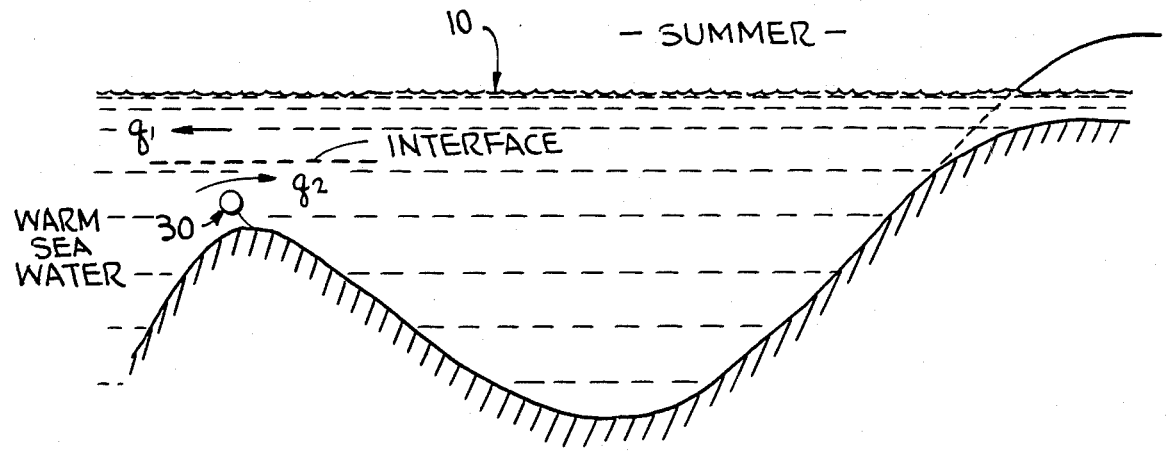
FIG. 4 — SUMMER —
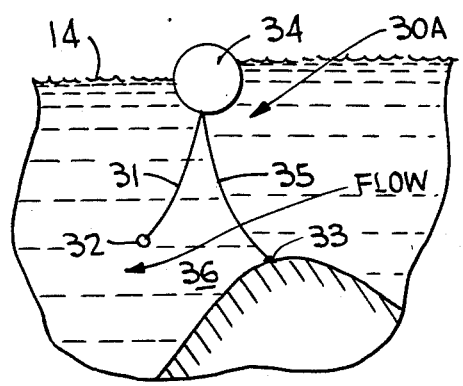
FIG. 5 — SPRING —
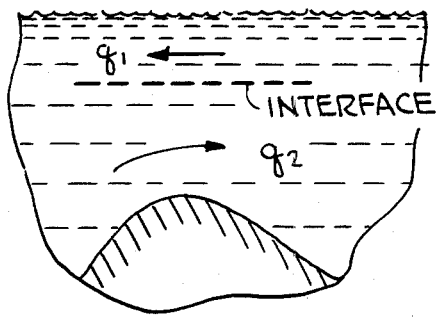
FIG. 6 — MIDSUMMER —
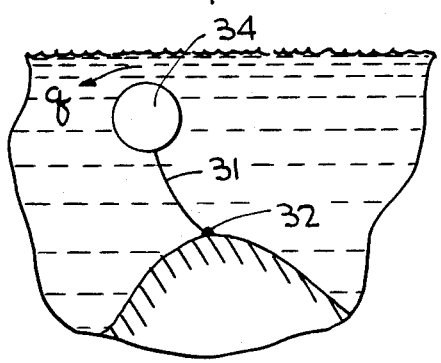
FIG. 7 — FALL & WINTER —

METHOD OF AND MEANS FOR SEASONALLY STORING HEAT IN A BODY OF WATER

DESCRIPTION

Technical Field

This invention relates to a method of and means for seasonally storing heat in a body of water.

BACKGROUND OF INVENTION

Some energy conversion processes, such as heat pumps, operate on a thermal head of only a few degrees so that the availability of large quantities of low grade heat in cold regions would provide a practical solution to many heating problems. In one conventional technique, a source of low-grade heat is created in a lake by using vertically disposed floating curtains defining a closed, segregated region in the lake, and by covering the region with floating insulation blocks. By directing the discharge of condenser water from a nuclear or conventional power station, for example, into the upper portion of the segregated region, relatively warm water deposited therein throughout the summertime will collect within the curtain and beneath the insulation blocks providing a large volume of hot water which can be maintained through the winter in northern countries such as Sweden, the insulating blocks serving to reduce conductive and radiant heat loss to the ambient environment.

A basic deficiency in the this approach, in addition to constructional and material problems, is the need to establish a segregated heat storage region in a body of water at a location adjacent a man-made source of low-grade heat. This is not always practical; and for this reason, it is an object of the present invention to provide a new and improved method of and means for seasonally storing heat in a body of water without erecting a segregated region in a body of water and without requiring a segregated region covered by floating insulating blocks to protect the heated water.

DISCLOSURE OF INVENTION

In accordance with the present invention, heat is stored in a closed basin having a net inflow of relatively fresher water connected by a straight to a larger body of relatively saltier water by selectively controlling the exchange of water between the body and the basin as a function of the season of the year. In summer, the exchange of water is promoted thereby permitting relatively warmer and saltier water outside the basin to flow through the strait into the depths of the basin. In winter, the exchange of water between the basin and the body of water is suppressed thereby trapping warm, relatively saltier water in the lower regions of the basin, the warm water being available during the winter and being protected against heat loss by a surface layer of relatively fresher water. The heat thus stored can be utilized in various energy conversion processes such as heat pumps to raise the temperature to useful levels.

A closed basin having a net inflow of relatively fresh water connected by a strait to a larger body of relatively saltier water, hereinafter called a basin of the type described, exists in many parts of the world. For example, the Baltic Sea is a basin of the type described as are deep Fjords in Scandinavia and many estuaries throughout the world. In basins of the type described, the inflow of fresh water due to the discharge of rivers, for example, and precipitation, will exceed evaporation with the result that a two layer flow regime through the strait is established. The upper layer, made up of a combination of fresh water flowing into the basin and saline water from the depths of the basin mixed with the inflowing fresh water, flows through the strait, outwardly from the basin, into the larger body of water at the surface. Saline seawater flows beneath the upper layer from the larger body of water through the strait inwardly into the lower region of the basin in a direction opposite to the upper fresher layer of water. Between the oppositely flowing layers is an intermediate layer which is actually an interface between the upper and lower layers.

The pressure head that produces the upper layer that flows outwardly through the strait is due to the higher water level in the basin as compared to sea level. Such higher water level is due to the inflow of fresher water, e.g., due to the discharge of a river into the basin, and provides a differential head that produces the upper flow. The pressure head that produces the inward flow of the lower layer through the strait is due to the pressure difference between the water in the sea outside the basin at the same depth and pressure at such depth in the basin itself. The theories for two-layer flow in estuaries is given by Stommel and Farmer (*Journal of Marine Research*, 11, 205–214, 1957), and for sea straits by Assaf and Hecht (*Deep Sea Research*, Vol. 21, 947–948, 1974).

In a basin of the type described with two-layer flow through the strait, the exchange (i.e., the volume mass flux in the lower of the two layers entering the basin) is limited by the rate of mixing in the basin. Such mixing arises by reason of wind action at the surface and tidal action; and the more mixing that occurs the greater the exchange through the strait. In this condition, the basin is said to be in an undermixed state. When the mixing increases to a level such that the exchange reaches a maximum value, more mixing does not alter the exchange. In such a case, the exchange is controlled by the strait and the basin is said to be in an overmixed state.

The basic concept of the present invention is to store relatively warm water in a closed basin of the type described by promoting the exchange of water in the summer and suppressing the exchange in winter. Where the climatic conditions and the geometry of the strait are such that the basin is in a natural state of undermixing (e.g., a deep and narrow basin like deep Fjords in Scandinavia), the exchange of water is promoted in the summer by induced artificial mixing of deep water in the basin with surface water. In such case, the exchange of water is suppressed in winter by suppressing external mixing in the basin. When a basin of the type described is in an overmixed state, or even in an undermixed state, the exchange of water can be controlled by controlling the depth of the strait. The exchange of water is promoted in the summer by increasing the depth of the strait; while the exchange of water is suppressed in the winter by decreasing the depth of the strait.

When the exchange of water is suppressed by selectively decreasing the depth of the strait in the winter, the inflow of fresh water to the basin will decrease the salinity of the water in the basin thereby creating a relatively large counter-pressure gradiant across the artificial bottom of the strait. When this artificial constraint is removed and the depth of the strait is increased during the summertime, the pressure gradient will be effective in maximizing the amount of warm saline water that will replace the deep fresher water in the basin. In this manner, a large amount of heat will be stored for the winter season.

In one mode of operation, the strait is kept open all during the year; and only the depth of the strait will be varied in accordance with the seasons in the manner indicated above. A tight sealing of the barrier defining the artificial bottom of the strait in the winter is not needed and practically any barrier system that will block the bottom portion of the strait will be satisfactory. In certain straits which are too narrow or perhaps too shallow to support the required exchange, the depth of the strait may be increased in order to provide for the desired exchange in the summer, an artificial barrier being provided in the winter to decrease the depth of the strait.

BRIEF DESCRIPTION OF DRAWINGS

Embodiments of the present invention are shown in detail in the accompanying drawing wherein:

FIG. 4 is a view similar to FIG. 3 showing the basin in the summer where the strait is unblocked for promoting the exchange of water;

FIG. 5 is another embodiment of a mechanism for controlling the exchange of water between the basin and a large body of water during the spring for enhancing the reduction in salinity of water in the basin during the spring;

FIG. 6 is a view similar to FIG. 5 but showing the strait configuration during mid-summer when the exchange of water is promoted; and FIG. 7 is a sectional view of the strait of FIGS. 5 and 6 showing the configuration during fall and winter for blocking the exchange of water.

BEST MODE FOR CARRYING OUT THE INVENTION

Figure 1:
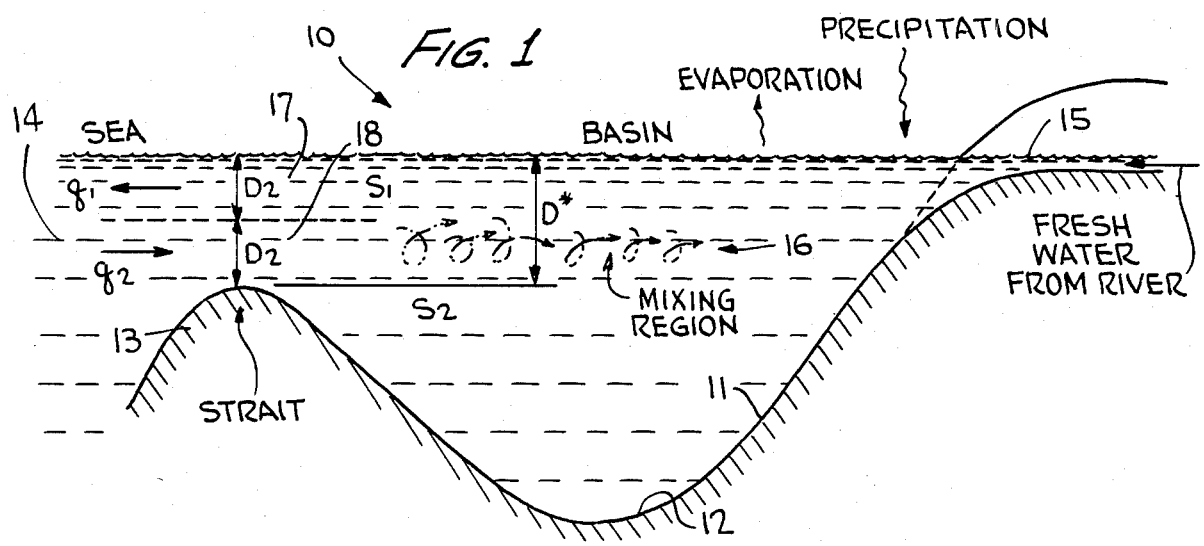
FIG. 1 is a schematic cross-sectional view of a basin of the type described in a state of undermixing.

Referring now to FIG. 1, reference numeral 10 designates a basin of the type described in the form of an estuary. Specifically, basin 10 is defined by land mass 11 in the form of a relatively deep depression 12 and a shallower portion 13 defining a strait that connects basin 10 to a larger body of water 14 such as a sea whose water is relatively saltier than the water in the basin. Specifically, river 15 discharges fresh water into the basin. The amount of fresh water introduced into the basin is increased by precipitation; and the total fresh water input exceeds the water evaporated from the basin.

As is well known, the natural flow regime shown in FIG. 1 is established in many basins of the type described. Specifically, fresh water flowing into the basin mixes with saline water from the lower region of the basin. For reference purposes, mixing takes place in a so-called mixing region 16 at a mean depth $D^*$. The resultant mixture of the fresh water with the deep saline water discharges through straits 13 as upper layer 17, the volume mass flow being designated $q_1$. The saline seawater from sea 14 flows inwardly through strait 13 below upper layer 17 in the form of a lower layer 18 thereby completing the exchange of water between the basin and the sea. The volume mass flow of layer 18 is designated $q_2$.

The pressure head that contributes to the flow of upper layer 17, which is of a density less than lower layer 18, arises because of the water level in the basin due to the discharge of river 15 is higher than the level of water in sea 14. The saline water in the sea is denser than the average density of the water in the basin; and at some predetermined depth, the pressure head in the seawater will exceed the pressure head at the same depth in the basin. As a consequence, this pressure difference will result in the flow of layer 18.

It can be shown that in many basins the flow through the strait tends to be critical with respect to internal Froud conditions where the flow rate does not exceed the speed of interfacial waves between the upper and lower layers. That is to say, the flow approaches, but does not exceed the flowing conditions:

$$U_1^2/(g'D_1) + U_2^2/(g'D_2) = 1 \tag{1}$$

where $U_1$ is the outward velocity of the upper layer 17, $U_2$ is the inwardly directed velocity in lower layer 18, $D_1$ and $D_2$ are the depths of the layers 17 and 18, respectively, at the straits, $g'$ is the reduced gravity of the lower layer with respect to the upper layer (i.e., $g'$ equal $g\Delta\rho/\rho$), where $\rho$ is the reference density and $\Delta\rho$ is the density difference in the two layers).

It can be shown from the literature cited above, that, taking the water, salt and heat balance of the basin into consideration with the critical condition set forth in equation (1), the straits equation can be obtained:

$$1/(1-n)^3 + s^2/n^3 = (s-1)^3/F_p \tag{2}$$

where $n = D_1/D_1 + D_2$, $s = s_1/s_1/s_2$, and the quantity $F_p$ is as follows:

$$F_p = (m_o^2)(s)/\rho^{-2}A^2g(D_1+D_2)(\alpha_s S_2 + \alpha_T hs) \tag{3}$$

where $m_o$ is the net excess of fresh water inflow to the basin (Kg/sec), A is the cross-sectional area of the strait, $h = T_1 - T_2 - H/C_p m_0$, $T_1$ and $T_2$ are the temperatures of the two layers, H is the heat flux into the basin, $\alpha_s = (1/s)(d\rho/dS)$, and $\alpha_T = (1/s)(d\rho/dT)$.

The strait equation relates to salinity ratio s to the nondimensional interfacial depth n. The parameters $m_o$ and h, and the salinity of the sea $s_2$ are parameters external to the basin and relate to climatic conditions while the parameters $D_1 + D_2$ and A, are parameters of the strait. Thus, for a given climate and strait, equation (2) provides the relationship between s and n. There are an infinite number of pairs of these numbers which satisfy equation (2). However, nature determines the value of s and n through the rate of vertical mixing. Such mixing is dependent on the rate at which kinetic energy is introduced into the basin by the action of winds and tides. Thus, a given basin will have associated with it a mixing depth $D^*$. When the depth $D^*$ is less than the mean depth of the basin, the basin is said to be in an undermixed state. The greater the mixing, and as a consequence the greater the depth D*, the larger will be the exchange between the sea and the basin. That is to say, increasing the mixing that takes place in the basin will increase the magnitudes of $q_1$ and $q_2$.

When the depth D* is comparable to the mean depth of the basin, mixing will be uniformly distributed throughout the basin and the basin is said to be in an "overmixed" state. In this situation, the exchange between the sea and the basin is at its maximum value; and further mixing of the basin will not change the exchange. Therefore, when the basin is in an overmixed state, the exchange is controlled entirely by the strait.

The basic concept in the present disclosure is based on selectively controlling the exchange of water between sea 14 and basin 10 as a function of the season of the year. That is to say, the exchange of water is promoted in the summertime when the seawater is relatively warm and suppressed in the winter. In this manner, the water in basin 10 is replaced in the summer with relatively warm seawater which remains trapped in the basin when the exchange is terminated at the end of the summertime. Thus, during the winter, basin 10 will contain relatively warm seawater that will be insulated from radiant and conductive heat loss to the ambient atmosphere by reason of the fresh water layer at the surface of the basin. In northern latitudes, the temperature differential between the relatively warm seawater and ambient air in the wintertime can exceed 20° C. This temprature differential can be utilized by a heat pump, for example, for raising the water temperature to a more useful level.

In certain basins which are deep and narrow, like deep Fjords in Scandinavia, natural mixing may be at such a low level that essentially the basin is in a very unmixed state. In such case, the mixing zone may penetrate only some 20-30 meters from the surface, while the depth of the basin may be of the order of magnitude of 600 meters. Only the shallow upper mixing layer will be replaced in summer by the salty seawater. Therefore, the exchange of water is promoted in the summer in a basin of the type described, which is an undermixed state, by artificially increasing the mixing in the basin. Representative ways of achieving this are illustrated in FIG. 2A or 2B.

Figure 2A:
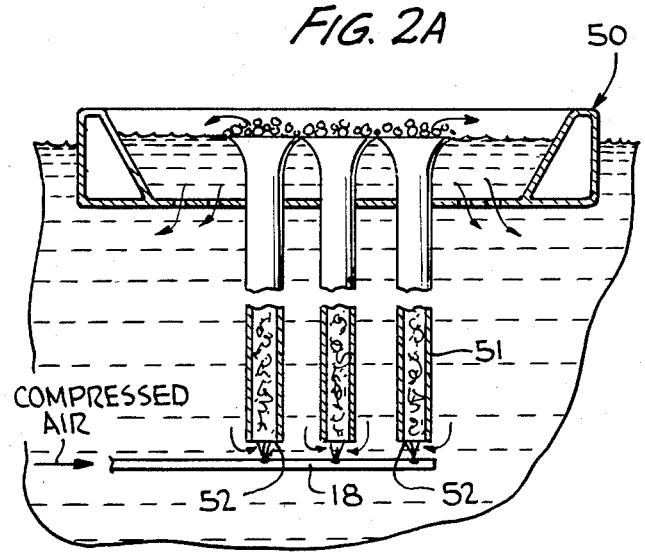
FIG. 2A is a portion of a cross-section of a basin of the type described showing a mixing process carried out by the injection of compressed air in the deep water of the basin for the purpose of changing the state of the basin.

In FIG. 2A, a floating container 50 having a shallow draft is provided with one or more vertical tubes 51 which may be about ten meters in diameter and about 50 meters in length (depending on the basin depth and stratification). Each tube 51 act as an airlift when compressed air is applied through line 18 to the open bottom 52 of the tube, provided the ratio of the volume of gas in the tube to the volume of water therein is less than about 0.3. Under this condition, bubble flow (as distinguished from slug flow) will occur in the tubes 51 causing the mean density of the water surrounding the tubes to exceed the mean density of the air/water mixture in the tubes. Consequently, water enters the bottom open end 52 of the lift tubes and is raised into container 50. The water in the container so raised is denser than the water outside the container, and the water level therein is a few centimeters above the water level in the basin. As a consequence, the water in the container flows outwardly through a plurality of apertures provided in the bottom and sides of the container as indicated by the arrows in FIG. 2A. Preferably, the projected area of the container is at least ten times the total cros-sectional area of the tubes; and the apertures in the bottom of the container are about 2-3 cm in diameter. The resultant mixing of the cooler, more dense water from the lower portion of the basin with the surface water will cool the surface water and thus increase the heat exchange in the summer.

Figure 2B:
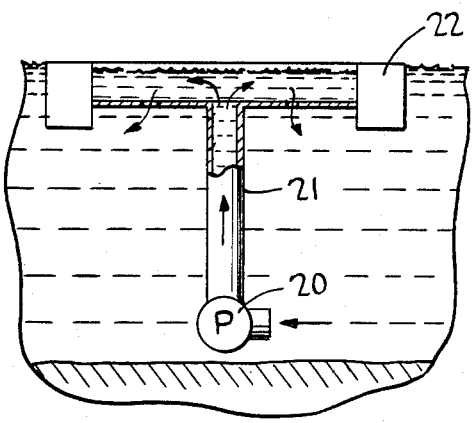
FIG. 2B is a variation of a mixing process shown in FIG. 2A wherein a low-head pump is used for mixing deep water with surface water in a basin of the type described.

Alternatively, the arrangement shown in FIG. 2B can be utilized wherein a relatively low head pump 20 located at the bottom of a relatively long tube 21 is utilized for pumping water from near the bottom of the basin into chamber 21 at the other end of the tube and located at the surface of the water in the basin. Preferably, chamber 21 is supported by floats 22 so that deep water from the basin is pumped into the chamber and is mixed with surface water by providing a series of apertures in chamber 21. A relatively small amount of power is required to drive the pump because the pump need produce only a pressure difference of the order of magnitude of the difference in density between the deep water and the surface water. Thus, only 1/1000 of a kilowatt hour per cubic meter of water will be required, i.e., about 1 watt hour.

Alternative to the arrangement shown in FIG. 2B, where water is pumped from the lower region of the basin to the upper region by a pump located at the bottom of a tube, pumping can be carried out by locating the pump at the top of the tube and pumping surface water to the lower region of the basin.

When the straits are narrow or shallow and the water body is large, the mixing will affect the heat storage in a different way: it will reduce the summer sea surface temperature. With such a reduction in sea surface temperature, the seasonal heat storage of the sea will increase. That is to say, the sea will be able to absorb more heat from the sun than would occur if the surface temperature were not modified. This effect can be described in relation to the Baltic Sea. Surface mixing in summer will increase the heat storage of the Baltic Sea directly as the surface temperature of the sea is reduced; and with this result, the heat flux from the sea surface will be reduced. (Colder surfaces give less heat to the atmosphere). As a result, the net seasonal heat storage will be increase.

In certain locations such as the inner sea of Japan, reducing the surface temperature of the sea in summer may reduce the temperature in coastal regions and with it the load on the air conditioning may be reduced as well.

In basins of the type described where artificial mixing is introduced for the purpose of promoting the exchange in the summer, termination of the artificial mixing in winter will permit a very large volume of relatively warm seawater to remain trapped in the basin and become available for heating in the water.

In many basins of the type described, the exchange can be adequately controlled by varying the depth of the strait as a function of the season of the year. For example, increasing the depth of the strait during the summer will promote the exchange of water while decreasing the depth of the strait in the winter will suppress the exchange.

Figure 3:
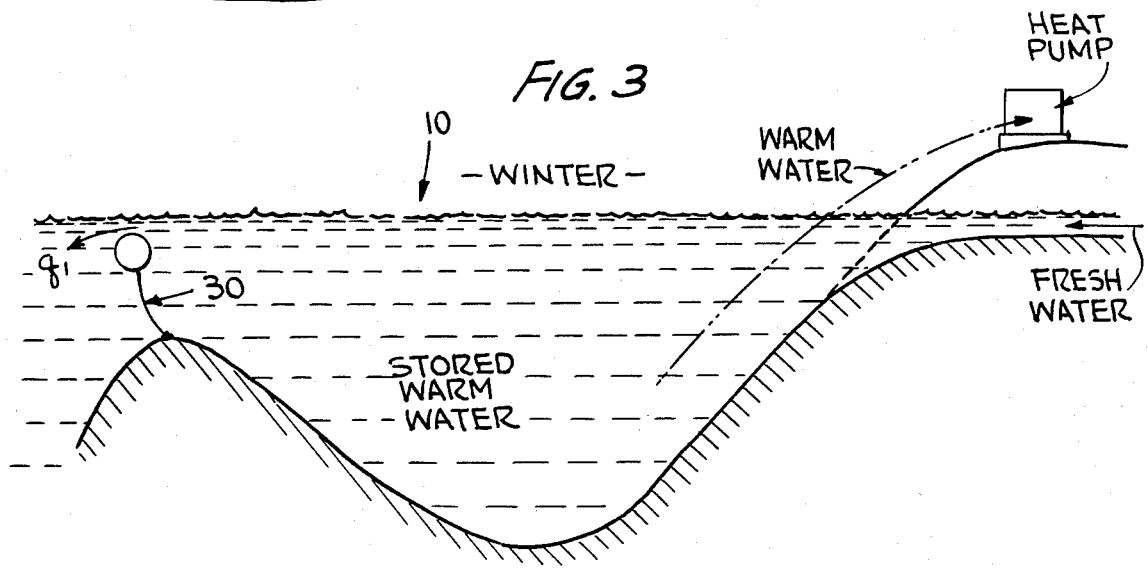
FIG. 3 is a schematic showing of a basin of the type described wherein the strait is blocked along its lower length for the purpose of suppressing exchange of water with a larger body of water outside the basin during the winter.

Controlling the depth of a strait is illustrated in FIGS. 3 and 4 to which reference is now made. As shown in FIG. 3, vertically moveable barrier 30, which extends laterally across the throat of the strait, is provided on the bottom of the strait. The barrier is moveable to an extended position such as shown in FIG. 3 where it blocks the lower portion of the strait and prevents any substantial exchange between sea 14 and basin 10. The position of barrier 30 shown in FIG. 3 is the winter position where the basin contains warm water stored from the previous summer. By a suitable piping arrangement (not shown) warm water from the deep portion of the basin is piped to an energy converting system such as heat pump 31. Alternatively, the energy converter can be a spray lift of the type disclosed in patent application Ser. No. 097,439 filed by the present applicant on Nov. 26, 1979.

As shown in FIG. 3, the fresh water input to the basin establishes a flow outwardly through the strait, the magnitude of such flow being substantially equal to the net inflow of fresh water. As indicated above, this relatively fresh and less dense water at the surface of the basin will provide an insulating effect on the warmer and more dense water at the depths of the basin.

As shown in FIG. 4, barrier 30 is lowered in the summertime to permit an exchange of water to take place between sea 14 and basin 10. This situation is applicable throughout the summer season until the basin is completely filled with relatively warm seawater.

The preferred form of the barrier is illustrated in FIGS. 5–7. Specifically, barrier 30A is in the form of a sheet of impermeable and flexible material 31 extending across the width of the strait and supported at its top edge by elongated float 34. The lower lengthwise edge 32 of the barrier is weighted so as to form opening 36 when float 34 is anchored at 33 to the bottom of strait 13A by cables 35. Opening 36 extends across the width of the strait and provides a flowpath connecting the basin to the sea. In this condition, the net inflow of fresh water will collect at the surface of the basin with the result that the water in the basin will become fresher and lighter than the water in sea 14. In mid-summer, cables 35 are released to remove barrier 30A, or the latter is lowered, in order to increase the depth of the strait and promote the exchange of water between the sea and the basin. This is illustrated in FIG. 6 where a two-layer flow regime through the strait is established. During this time, the respectively warm seawater will displace the deep water in the basin.

In the fall and during the winter, the barrier is tethered to the bottom of the strait by anchoring bottom edge 32 to the strait such that float 34 is just below the surface of the water in the strait. The net flow of water through the strait is due to the fresh water input to the basin.

It is believed that the advantages and improved results furnished by the method and apparatus of the present invention are apparent from the foregoing description of the preferred embodiment of the invention. Various changes and modifications may be made without departing from the spirit and scope of the invention as described in the claims that follow.

I claim:

1. A method for storing heat in a closed basin having an upper layer of relatively fresh water connected by a strait to a larger body of relatively saltier water comprising the step of selectively controlling the exchange of water between the body of water and the basin as a function of the season of the year.

2. A method according to claim 1 including the step of promoting the exchange of water from the body of water in the summer and suppressing the exchange in the winter.

3. A method according to claim 2 wherein the depth of the strait is selectively changed as a function of the season of the year.

4. A method according to claim 3 wherein the exchange of water is promoted in the summer by increasing the depth of the strait.

5. A method according to claim 4 wherein the exchange of water is suppressed in the winter by decreasing the depth of the strait.

6. A method according to claim 2 wherein the exchange of water is promoted in the summer by artificially mixing deep water in the basin with surface water.

7. A method according to claim 6 wherein the exchange of water is suppressed in the winter by suppressing artificial mixing in the basin.

8. In a heat storage system of the type having a closed basin in which the surface waters are relatively fresh and being connected by a strait to a larger body of relatively saltier water, the improvement comprising means for selectively controlling the exchange of water between the body of water and the basin.

9. The improvement of claim 8 including means for selectively mixing deep water in the basin with surface water.

10. The improvement of claim 8 including means for selectively controlling the depth of the strait.

11. The improvement of claim 10 including a vertically moveable barrier in the strait, the barrier extending across the width of the strait.

12. The improvement of claim 11 wherein the barrier is moveable to an extended position where it blocks any substantial exchange between the basin and the body of water.

13. The improvement of claim 12 wherein the barrier effects the flow through the strait of surface water from the basin into the larger body of water when the barrier is in an extended position.

14. The improvement of claim 13 wherein the barrier is moveable to a retracted position wherein it effects exchange between the basin and the body of water.

15. Apparatus for selectively controlling the exchange of water through a strait connecting a basin to a larger body of water comprising:
   (a) a barrier in the form of a sheet of impermeable material having a lower lengthwise edge;
   (b) anchor means for releasably securing said edge to the bottom of the strait across the width thereof; and
   (c) floatation means secured to the upper lengthwise edge of the barrier for buoyantly supporting the sheet below the surface of the water in the strait and blocking the exchange of water between the basin and the body of water.

16. Apparatus according to claim 15 including means for releasing the anchor means so that the lower lengthwise edge is free of the bottom of the strait when the floatation means floats on the surface of the water in the strait and means for holding the barrier in the strait so that the lower edge defines an opening which connects the basin with the larger body of water.

17. Apparatus according to claim 16 wherein the lower edge of the barrier is weighted.

18. Apparatus according to claim 15 including means for selectively effecting the exchange of water between the larger body of water and the basin.

* * * * *